United States Patent [19]
Lewis

[11] 3,760,038

[45] Sept. 18, 1973

[54] PHOSPHONATED POLYOXYALKYLENE ETHERS

[75] Inventor: Morton Lewis, Elmhurst, Ill.

[73] Assignee: Swift & Company, Chicago, Ill.

[22] Filed: Nov. 20, 1969

[21] Appl. No.: 878,570

[52] U.S. Cl. .......... 260/932, 252/49.9, 260/2.5 AR, 260/969
[51] Int. Cl. .......... C07f 9/40, C08g 22/44
[58] Field of Search .......... 260/932, 969

[56] References Cited
UNITED STATES PATENTS

| | | | |
|---|---|---|---|
| 3,636,163 | 1/1972 | Jenkner et al. | 260/615 B |
| 3,600,470 | 8/1971 | Lewis | 260/969 X |
| 3,161,667 | 12/1964 | Abramo et al. | 260/932 |
| 3,485,897 | 12/1969 | Jenkner | 260/932 |

Primary Examiner—Lewis Gotts
Assistant Examiner—Anton H. Sutto
Attorney—Edward T. McCabe, Charles E. Bouton, Jay C. Langston and W. C. Davis

[57] ABSTRACT

Phosphonated polyoxyalkylene ethers are produced by reacting a halogen-containing polyoxyalkylene ether with an aliphatic or aromatic phosphite. The resulting compositions are used to prepare flame resistant, non-rigid polyurethane foams.

5 Claims, No Drawings

PHOSPHONATED POLYOXYALKYLENE ETHERS

This invention pertains generally to the preparation of novel polyether compounds containing phosphonate groups and may or may not contain halogen. The phosphonated polyoxyalkylene ethers are useful as lubricating oil additives and as a polyol reactant in the preparation of flame-resistant polyurethane foams.

It has previously been proposed to prepare polyurethane foams by reacting a polyhydroxy compound such as a polyester, a polyoxyalkylene glycol or similar polyols with an organic polyisocyanate in a reaction mass containing a foaming agent. Polyurethane foams produced in this conventional manner have some degree of flame resistance but it has been necessary in the past to produce a foam that possesses a much higher degree of flame resistance for use in a number of systems. For example, U.S. Pat. No. 2,577,281 teaches the use of an unsaturated alkyl ester of an aryl phosphonic acid in a foamable mixture to produce a foam that has fire-resistant properties. Halogen-containing esters of phosphonic acid and phosphorous acid, ammonium chloride, ammonium phosphate, chlorinated paraffins, chlorinated polyphenyls, chlorendic acid, and chlorendic anhydride have been used as additives in foamable reaction mixtures to impart flame-resistant properties to foam. Additives of these types are not chemically bonded in the urethane polymer and are slowly lost by volatilization, leaching and migration upon aging of the foam.

In addition, the use of flame-proofing additives may upset the surface chemistry of the foaming system and lead to severe destruction of internal cell structures, formation of a coarse cell structure and/or collapse of the foam during manufacturing. The difficulty in making successful flame-proofing urethane foams, as opposed to bulk materials, is further complicated by the trouble-some problems of proper additive distribution at gas-solid interfacial surfaces due to the inherent physical movement of the composition during the foaming operation.

Foams made flame-resistant merely by the physical addition of additives often deteriorate on aging because the additives act as plasticizers. Deteriorization of this type also adversely affects the physical properties of the foam. For example, a halogen-containing material incorporated into a urethane foam may reduce flammability tendencies but at the same time act as a migrating plasticizer during the curing or foaming operation or in use and effect a loss of tensile strength, compression set or load-bearing properties.

Polyurethane foams may be classified as rigid, semi-rigid, flexible, etc., and the art of making each particular type has been developed to a high degree. For example, in the making of polyurethane foams, various components such as surfactants, blowing agents, particular isocyanates, particular polyols, etc. have been experimented with to obtain foams having special characteristics. In the formulation of these polyurethane foams, special consideration must be given to the effect of each of the various components on the physical properties as well as the flammability characteristics.

At the present time, there are many different compounds being used to impart flame retardancy in urethanes; however, only a select few are effective when used in non-rigid urethane systems. Various percentages of chlorine, bromine, antimony and phosphorous are integral parts of these compounds, and it is these elements which make the component an effective flame retardant. Some compounds contain only one of these elements while others contain two or three. These compounds fall generally into one of two basic classes when used in a urethane system since they are either reactive or non-reactive in reference to the isocyanate component of the system.

In addition to its normal level of flame-retardant elements, a reactive flame retardant in a urethane reaction can be described chemically as a compound containing one or more labile hydrogen atoms available as reactive sites. The labile hydrogen can be part of any group such as amino, hydroxyl, or carboxyl, etc., but it has to be reactive enough to react with the isocyano group of the isocyanate.

The reactive type of flame-retardant additive can combine chemically with the foam and will not evaporate from the surface or leach out when the foam is completely cured. However, not all reactive compounds can be used to produce a suitable non-rigid foam. Further, some compounds have too high a cross-linking density, and their use is limited to the rigid urethane foam systems.

A second type of flame retardant which can be used in non-rigid polyurethane systems is a compound still containing flame retardant elements but having no hydrogens available for reaction with isocyanate groups.

Some non-reactive compounds are effective flame retardants; however, their effectiveness is reduced considerably over time. This is so because they tend to evaporate and leach out due to the high surface area to weight ratio of the flexible foams. This type of product simply adds dead weight to the foam, thus increasing the density which is an economic disadvantage since additional cost is incurred with no additional volume of foam produced.

Incorporation of flame retardant materials in the urethane foams by chemically bonding the additives into the polymer network offers advantages over foams containing non-reactive, additive flame retardants. In this connection, it has been proposed in U.S. Pat. No. 3,206,416 to use halogenated castor oil, namely brominated or chlorinated castor oil, as a reactive flame retardant in polyurethane foams.

These halogenated castor oils produce flame-resistant polyurethane foams but possess the disadvantage of themselves being chemically unstable at ambient temperature or temperatures in the range of from 15° C. to 40°C. Use of these halogenated oils in polyurethane foam preparations is then limited since the physical properties of the compound that are important for imparting the desired properties into the foam, especially viscosity, hydroxyl number, acid number and color, change substantially on aging at ambient temperatures. For example, brominated castor oil prepared in accordance with the process of the aforementioned patent undergoes a decrease of hydroxyl number and a parallel increase in acid number during aging.

The use of halogenated castor oils as reactive flame-retardant polyols in polyurethane foams suffers from the disadvantage of having physical properties constantly changing on aging. A mixture that is formulated using these halogenated oils as the polyol constituent may not be foamable since the large concentration of acid may effectively neutralize the small amount of amine and organo-metallic catalysts that are often added to catalyze the urethane reactions.

While most of the reactive flame retardants on the market today are designed for the rigid systems, manufacturers are constantly seeking new constituents for the flexible urethane foam market. However, several difficulties are apparent when trying to apply rigid foam flame retardants to flexibles. If a flame retardant could be designed much like one of the main components of the foam, then it could be substituted into the foamable composition to give a minimum of adverse effects.

It is one object of this invention to prepare new compositions of matter containing phosphonate groups.

It is another object of this invention to provide a method for making flame resistant polyurethane foams which will remain so even after prolonged aging periods.

Another object of this invention is the production of phosphonated polyoxyalkylene ethers that possess stability and physical properties that remain essentially unchanged upon aging.

Additional objects, if not specifically set forth herein, will be readily apparent to those skilled in the art from a reading of the detailed description of the invention which follows.

Generally, the compositions of this invention comprise phosphonated polyoxyalkylene ethers and may or may not contain halogen depending upon the amounts of reactants involved. The products are formed by reacting a trialiphatic or triaromatic phosphite or a mixed trialiphatic, aromatic phosphite with a halogen-containing polyoxyalkylene ether. In carrying out the process, it is possible to remove all of the halogen present on the polyoxyalkylene ether by adding an equivalent amount of phosphite for all the halide and thus synthesize a completely phosphonated polyether. In those instances where halogen is desirable, i.e. flame-proofing compositions, the totally phosphonated products lie outside the scope of this class of compounds. However, the totally phosphonated polyethers are clearly novel compositions of matter and function as additives for lubricating oils. The fully phosphonated polyethers improve the wear and extreme pressure properties of petroleum and synthetic diester lubricants.

The halogen-containing polyethers used to react with the phosphite will generally possess about 20 percent to about 69 percent by weight of the molecule of a halogen, usually chlorine, bromine or iodine. Due to the method by which the halogen-containing polyether is formed (polymerization of an epoxy halo alkane) each alkyleneoxy group of the polymeric polyoxyalkylene polyether will contain a halogen atom when only epihalohydrins are used. For purposes of this invention, the term "polymerization" of an epoxy halo alkane is meant to include homopolymerization or copolymerization of two or more epoxy halo alkanes, or the co-polymerization of an epoxy halo alkane with an alkylene oxide such as ethylene oxide, propylene oxide, butylene oxide or the like.

During the phosphonation step about 0.1 to 100 percent of the replaceable halogen is replaced by a phosphonate group with the liberation of an organic halide; and alkyl halide if a trialkyl phosphite was used. When forming a polyol for flexible urethane foams enough phosphite is used so that the final product will contain about 1 to about 5 percent by weight, of phosphorus.

In preparing the novel compositions of this invention, a trialiphatic or triaromatic phosphite is reacted with the halogen-containing polyoxyalkylene ether (one mole of phosphite per each halogen equivalent to be removed) at temperatures below about 150° C. The polyoxyalkylene reactant possesses terminal hydroxyl functions and in order to preserve the integrity of the hydroxyl functions the reaction mass should not be allowed to rise above about 150° C.

It is important that the temperature be mild since temperatures held too high result in drastically decreased hydroxyl values. Since any utility in urethane foam systems is dependent upon hydroxyl value, the reaction temperature should be controlled during phosphonation. If the temperature does get to 150° C. or higher there is a loss of hydroxyl value, and the longer it is held at this high range the lower is the resulting hydroxyl value of the product. The hydroxyl value of a polyol useful for non-rigid urethane foams must be in the 25 to 300 range, 30 to 100 for flexibles and more specifically around 40 to 60. Any drastic decrease in hydroxyl value for the polyol will render it useless or at best of minimum value in urethane systems. Temperatures that are too low, that is below about 40° C., cause the reaction time to be too long to incorporate the necessary amount of phosphorus. Accordingly, reaction temperatures of 80° C. to 140° C. are utilized when no solvent is used in the system. Use of an inert, high dielectric constant solvent increases the rate of reaction and allows for the use of a lower temperature or shorter reaction times.

During the reaction, air or nitrogen can be used to strip off the organic halide, usually a lower alkyl halide which is formed during the reaction or else the reaction can be run under a partial vacuum to accomplish the same thing. The reaction mass is normally rapidly heated to about 110° to 125° C. and maintained there for about 2½ to 10 hours. After the reaction is essentially complete the reflux condenser is removed and replaced with a gas take-off adaptor. Vacuum can be applied for 15 minutes to two hours while maintaining the temperature at around 110–115° C. If more phosphite than is desired to react is used, the excess phosphite should be removed before it all reacts. The product can be passed through a falling film molecular still to remove any unreacted starting material.

In the reaction, the phosphorus of the phosphite shifts from the trivalent state to the pentavalent state; the additional two valence bonds being occupied by an oxo-oxygen atom. Attention is directed to the fact that this product contains a carbon-phosphorus bond. This is very important. In many phosphorus-containing polyol components, the phosphorus is bound through a C—O—P ester linkage (from C—OH alcohol, and P—OH acid). Since this is an ester linkage, it is subject to hydrolysis especially over time in humid conditions, and therefore the phosphorus can be separated and leached from the foam. This can destroy the foam structure as well as decreasing or eliminating the fire retardant properties. In the instant invention, the halogen and the phosphorus, which act synergistically in fire retardancy, are bound to the polyol. The carbon-phosphorus bond precludes any chance that the phosphorus may be separated by later hydrolysis. Therefore the halogen and the phosphorus become an integral part of the urethane foam system and remain there over the life of the foam system. There is no decrease in flame retardancy over time due to leaching out or hydrolysis of the system.

When using a trialkyl phosphite, normally a lower alkyl phosphite is used so that the by-product, in this case an alkyl halide, will be volatile and, hence, easily distilled from the reaction mixture. Further, when making flame retardancy polyols, the long chained phosphite should be avoided since two of the -OR groups of the phosphite stay attached to the phosphorus atom and long carbon chains add to the combustibility of the product. However, long chain phosphites, at least mixed phosphites such as diethyl octadecenyl phosphite are contemplated with the liberation of the lowest chained radical going off first as an alkyl halide.

Highly desirable phosphite reactants that can be used may be represented by the formula:

$$(RO)_3P$$

wherein R is a straight or branched chain alkyl, alkenyl, alkynyl, haloalkyl or aryl radical of 1–20 carbons, preferably one to eight carbon atoms. Examples include trimethyl phosphite, triethyl phosphite, tripropyl phosphite, triisopropyl phosphite, tributyl phosphite, triisobutyl phosphite, triamyl phosphite, trihexyl phosphite, tri(2-ethylhexyl) phosphite, triheptyl phosphite, trioctyl phosphite and tri-(beta-chloroethyl) phosphite, etc. Mixed phosphites such as ethyldimethylphosphite, methyldiethylphosphite, ethyldibutylphosphite, propyldidoceylphosphite, diethyl octadecenylphosphite, may also be used. Also of importance are the unsaturated phosphites, such as triallyl phosphite, inasmuch as these compounds provide multiple reactive sites for subsequent halogenation or polymerization. Other unsaturated phosphites include tricinnamyl phosphite, trimethallyl phosphite, tri-2-butenyl phosphite, triisopropenyl phosphite and tri-2-cyclohexylallyl phosphite.

In general, the halogen-containing polyoxyalkylene ethers that are subsequently phosphonated in accordance with the teachings of this invention are mono up to dihydroxy and multiple halogen-containing ether adducts derived from homopolymerization or copolymerization of epoxy halo alkanes or the copolymerization of an epoxy halo alkane with a non-halogen containing epoxy compound having non-interferring groups. The ether adducts contain, on the average, two or less hydroxyl groups per each polymerized chain. The polymerization of the haloepoxide is conducted in the presence of an acidic catalyst to produce an adduct having a controlled degree of functionality.

The polymerization reaction is carried out at temperatures between about 30° C. and 180° C. in the presence of an acidic catalyst, usually of the Lewis acid type. Typical catalysts are $BF_3$, $SnCl_4$, $ZnCl_4$, $AlCl_3$, $TiCl_4$, etc. used in amounts of about 0.01 to about 3 percent based on the toal weight of the reactant. The reaction time to prepare the homopolymer or copolymer will vary depending upon the temperature of the reaction, the reactant employed, the amounts thereof, the use of a solvent, and the type of solvent. Generally, however, a reaction time in the range of between about 30 minutes and 100 hours is utilized.

The aliphatic haloepoxides that can be polymerized to form the hydroxy and halogen-containing ether derivatives that are subsequently phosphonated are those saturated or unsaturated aliphatic $C_3$–$C_{10}$ straight or branched chain haloepoxides. The halogen constituent on the epoxide is preferably a chlorine or bromine atom but iodine and fluorine are contemplated. Examples of preferred reactants are epichlorohydrin and epibromohydrin. Representative aliphatic haloepoxides include:

1 - chloro-2,3-epoxybutane; 3 - bromo-1,2-epoxybutane;
1 - bromo-3,4-epoxy-1-butene; 1,4-dichloro-2,3-epoxybutane;
1 - bromo-2,3-epoxyhexane; 1,4-dichloro-2,3-epoxyheptane;
1 - chloro-2,3-epoxyoctane; 4-bromo-2,3-epoxyoctane;
2 - chloro-3,4-epoxynonane, 2,5 dibromo, 3,4-epoxydecane etc.

These epoxy halo alkanes may be homopolymerized, i.e. polymerized with themselves, or copolymerized with one or more other halo epoxy alkanes. The epoxy halo alkanes may also be copolymerized with other non-halogen containing epoxy alkanes such as ethylene oxide, propylene oxide, butylene oxide, glycidol or glycidol alkane or aryl ethers, epoxy fatty acids or esters, etc. Although this reduces the amount of halogen in the polymerized product they still offer flame retardant properties when subsequently phosphonated. The epoxy alkanes that are copolymerized contain about 2 – 24 carbons when hydrocarbons and about 6 – 24 carbons per acyl radical when they are epoxy fatty esters.

The final product of the polymerization of the epihalohydrin is not a distinct substance but is a complex mixture covering a wide molecular weight range. The phosphonated derivative is, therefore, also a distribution of molecular weights. Further the amount of phosphorus incorporated into the molecule can be varied depending upon the amount of trialkyl phosphite used. Therefore one can nearly "tailor make" the molecule to whatever halogen-phosphorus ratio desired.

The homopolymerized product is represented below with the condition that at least about 90 percent of the composition comprises compounds wherein $n$ is an integer of 2 to about 100. When polymerized epichlorohydrin or epibromohydrin is used, the product may be described as

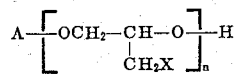

wherein A is H or an alkyl group of less than about eight carbons and $n$ is an integer of 2 to about 100. Further, X is halogen and/or $-PO(OR)_2$ and R is an aliphatic group of one to eight carbons.

When epichlorohydrin and epibromohydrin are copolymerized with ethylene oxide or propylene oxide, the product may be described as

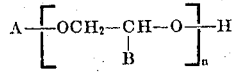

wherein A is hydrogen or an alkyl group of less than about six carbons, $n$ is an integer of 2 to about 100, B is H or $-CH_2X$ with the condition that not all B's are H; X can be halogen, H and $-PO(OR)_2$ however some X's must be halogen and some X's must be $-PO(OR)_2$ so that the molecule contains about 20 to about 69 percent by weight of halogen and R is an alkyl radical of one to four carbon atoms.

As discussed above, an outstanding use for the novel polyol phosphonates of this invention is in providing flame resistance for isocyanate or polyurethane foams. The term "flame-resistant" is used to characterize a material which does not burn readily. The phosphonated compounds of this invention may be used individually or in various mixtures and combinations with other hydroxy containing reactants. Due to the fact that these compositions possess on the average, two or less hydroxy groups per molecule, the compounds actually react with the isocyanates in the formation of urethane foams to produce flame resistant copolymers. In this respect, they may replace some or all of the polyols generally used in such formulations.

The production of polyurethane foams is well known and a detailed description of such processes is not warranted here. Briefly, however, the process involves the reaction of an isocyanate and another poly functional compound which contains an active hydrogen, i.e., hydroxyl, carboxyl, amino groups, etc.

Actual utility of the flame-resistant foams is typified by the technique of foam-in-place insulation. Such insulation has been used in automobiles, refrigerators and aircraft where the foams add strength as well as fire resistance to the various components. The degree of cross-linking and the type of polyols used determine whether the final product is rigid or flexible. Since the polyols of this invention may replace all or only a part of the normally used polyols, they are thus adaptable for use in either flexible or semi-rigid foams.

The invention contemplates either a pre-polymer process or a one-shot process for making polyurethane foams. In the pre-polymer process, the phosphonated polyols with or without another polyhydric alcohol is heated under substantially anhydrous conditions with an excess of organic polyisocyanate to form an isocyano terminated adduct. This adduct is then reacted with additional polyol or amino compound and water or blowing agent in a second step to produce a foam. In a one-shot process, the organic polyisocyanate, the phosphonated polyol and other ingredients of the foamable mixture are all mixed together substantially simultaneously.

In its broadest aspects, the invention contemplates the preparation of polyurethane foams using the phosphonated polyols of this invention as the sole polyol component of the polyurethane foam. However it is preferred that the phosphonated polyols be a constituent of a polyol mixture of two or more polyols used to prepare a polyurethane foam. Other polyols that can be used in this fashion to prepare fire retardant polyurethane foams are polyoxypropylene glycols. These polyols are preferred to be polymerized adducts of propylene oxide, tetrahydrofuran, 1,2-or 2,3-butylene oxide or the like with ethylene glycol, trimethylolpropane, pentaerythritol, 1,2,6-hexanetriol, 1,4-butanediol, sorbitol, mannitol, propylene glycol, sucrose, diethylene glycol, glycerine or the like.

Other alcohols that are not of a polymeric nature that might be employed as constituents of a polyol mixture that includes the adducts of this invention are the following: diethanolamine, triethanolamine, triisopropanolamine, diisopropanolamine, pentaerythritol, trimethyolpropane, glycerine or the like. It is preferred that these low molecular alcohols be at least difunctional and preferably tri or tetrafunctional and they can comprise from 5 to 75 percent by weight of the total polyol mixture. It is understood that the amount of polyoxyalkylene glycol or monomeric alcohol used in a polyol mixture, along with the phosphonate polyols of this invention will depend upon the physical properties and degree of flame retardancy desired in the polyurethane foam.

Any desirable organic di- or polyisocyanate can be used as the isocyanate componenet for the preparation of polyurethane foams. Organic polyisocyanates that can be used are 2,4-toluene diisocyanate; 2,6-toluene diisocyanate; and mixtures of the two ingredients, xylene-1,3-diisocyanate; xylene-1,4-diisocyanate; dodecamethylene diisocyanate; undecamethylene diisocyanate; pentamenthylene diisocyanate; ethylene diisocyanate; 4,2'-di-phenylmethane diisocyanate; m-phenylene diisocyanate; cyclohexylene-1,4-diisocyanate; p-isocyanatobenzyl isocyanate; bis(2-isocyanatoethyl) fumarate or the like.

Polyurethane foams can be manufactured in accordance with this invention by any suitable manipulative step or technique. Halogen alkanes or other gases can be included in the foam formulation to effect the blowing of the foam. Dichlorodifluoroethane, trichlorofluoromethane, trichlorotrifluoroethane and other halogenoalkanes, as well as inert gases like nitrogen or the like can be used alone or with water to form the porous foam structure. Water can be used alone in the reaction mixture to react with the polyisocyanate to form carbon dioxide which becomes entrapped in the reaction mixture to form the porous product.

Any suitable activator in an amount of about 0.01 to 2 percent, by weight basis adduct, such as stannous oleate, stannous octoate, triethylenediamine, dibutyltin dilaurate, tetramethyl 1,3-butanediamine, N-ethylmorpholine, piperazine, or the like, as well as combinations of these materials can be used. Emulsifiers and surfactants such as silicone oils and soaps can be used to improve the cell structure of the foam.

The compositions of this invention are particularly advantageous for the preparation of flame-resistant polyurethane foams since they are stable polyols at ambient temperatures and produce polyurethane foams that are uniform, contain no blow holes or cracks, show little or no tendency toward brittleness, do not shrink excessively on aging, have low density, and possess very good flame resistant properties. They also produce foams that have the flame retardant elements of halogen and phosphorus in a stable form that will not migrate or leach out of the foam. Since the phosphorus is bound to a carbon atom covalently it is not subject to hydrolysis and therefore will not lose its effectiveness over time. The polyol adducts prepared in accordance with this invention have low acid numbers and consequently do not necessitate the inclusion of amino alcohols or amines in the polyol mixture. The polyurethane foam which is made in accordance with this invention can be used for making chair and seat cushions and for insulation materials for buildings, home refrigerators, refrigerated trucks, and refrigerated railroad cars.

The following examples are set forth as illustrated embodiments of the invention and are not to be taken in any manner as limiting the scope of the invention.

EXAMPLE I

Into a one liter, 3-neck round bottom flask equipped with a motor driven stirrer, thermometer, and dropping funnel with pressure compensating side arm, was charged 750 grams of epibromohydrin. The epibromohydrin was pre-heated to about 70° C. and 7 grams of boron trifluoride etherate dissolved in 35 grams of benzene was slowly added. The reaction was vigorously exothermic and the heat of reaction was controlled by using an external ice bath and by controlling the rate at which the catalyst was added. The temperature was maintained between about 80 to 85°C. after all the catalysts had been added, the temperature was maintained at about 65°C. for an additional 4 hours. At this point a vacuum was applied to remove the benzene and then the product was cooled and washed with four 500 cc. portions of water. The washed homopolymer was separated from the water layer and passed through a falling film molecular still at 0.5 mm. Hg. and 110°C.

EXAMPLE II

Into a one liter, 3-neck round bottom flask equipped with a motor driven stirrer, thermometer, and dropping funnel with pressure compensating side arm, was charged 550 grams of epichlorohydrin. The epichlorohydrin was pre-heated to about 60°C and 5 grams of boron trifluoride etherate dissolved in 25 grams of benzene was added slowly. The vigorously exothermic reaction was controlled both by an external ice bath and by varying the rate at which the catalyst was added. The temperature was maintained at between about 75 – 80°C. After all the catalyst was added, the temperature was maintained at about 65°C for an additional 3 hours. A vacuum was then applied to remove the benzene and the product was cooled and washed with three 300 cc. portions of water. The washed homopolymer was separated from the water layer and passed through a falling film molecular still at about 0.5 mm. Hg. and 110°C.

EXAMPLE III

The stripped homopolymer of Example I (365 grams.) was charged into a 500 millimeter, 3-neck round bottom flask equipped with a stirrer, condenser and thermometer which had a temperature controller. Eighty grams of triethyl phosphite was added. The reaction mixture was heated to 115 to 120°C. with constant stirring and maintained at that range for 3½ hours. The pressure was reduced to 15 inches gage pressure during the course of the reaction. The pressure was then reduced to about 15 mm. of mercury for an additional one-half hour while the temperature was maintained. The finished phosphonate was passed through a falling film molecular still at 0.6 mm. Hg. and 140°C to further remove impurities. The finished phosphonated epibromohydrin homopolymer analyzed 40.6 percent bromine, 2.37 percent phosphorous, hydroxyl value of 40.7 and an acid value of less than 0.1.

EXAMPLE IV

The stripped homopolymer of Example II (300 grams) was charged into a 500 ml., 3-neck round bottom flask equipped with a stirrer, condenser, and thermometer which had a controller, and 45 grams of triethyl phosphite was added. The reaction mixture was heated to about 110°C with constant stirring and the pressure was reduced to about 15 inches gage pressure. These conditions were maintained for about 3½ hours, then the pressure was further reduced to about 15 mm. Hg. for an additional one-half hour. The finished phosphonate product was passed through a falling film molecular still at about 0.5 mm. Hg. at 130°C. The finished phosphonated epichlorohydrin homopolymer analyzed 30 percent chlorine, 2.2 percent phosphorus, with an acid value of about 0.1 and a hydroxyl value of about 100.

EXAMPLE V

The phosphonation reaction of the epibromohydrin homopolymer (200 grams) prepared by the method of Example I was done by the procedure of Example III except that 174 grams of tri(2-ethylhexyl) phosphite was used and the pressure was reduced to 15 mm. Hg. during the course of the reaction. For the last one-half hour the pressure was further reduced to about 0.8 mm. Hg. The final phosphonated product after passing through a molecular still analyzed 39 percent bromine, 1.7 percent phosphorus, hydroxyl value of 38.9 and an acid value of 0.2.

EXAMPLE VI

Equimolar quantities of epibromohydrin (137 grams) and epichlorohydrin (92.5 grams) were mixed in a 500 ml., 3-neck round bottom flask equipped as in Example I and 2 grams of boron trifluoride etherate in 10 grams of benzene was slowly added after the halohydrin mixture was pre-heated to 65°C. The exothermic reaction was controlled with an external ice bath and by controlling the rate of catalyst addition so that a reaction temperature of about 80°C was maintained. After all the catalyst was added the temperature was maintained at about 65°C for 3 hours before cooling and washing the product three times with 200 ml. portions of water. The co-polymer was separated and passed through a falling film molecular still at about 0.5 mm. Hg. and 110°C.

EXAMPLE VII

A portion of the epibromohydrin-epichlorohydrin co-polymer synthesized in Example VI (100 grams) was mixed with 18 grams of triethyl phosphite in a 250 ml. round bottom flask equipped as in Example III. The phosphonation reaction was run at 15 inches gage pressure and 115 – 120° C for 3½ hours followed by one-half at 15 mm. Hg. while the temperature was maintained. The phosphonated co-polymer was passed through a falling film molecular still.

EXAMPLE VIII

A flexible urethane foam was made by mixing 45 grams of a polyalkylene polyether, MW. 3000 (Union Carbide Polyol LG-56) and 5 grams of the phosphonated homopolymer of Example III, along with 0.1 gram of N-ethylmorpholine, 1 gram of a silicone surfactant L-520 (Union Carbide), and 0.25 grams of triethylene diamine. This mixture was stirred until homogeneous, then 2 grams of water and 0.14 grams of a tin catalyst (stannous octoate) was added and the mixture stirred vigorously. After a few seconds 26.1 grams of toluene diisocyanate was added with vigorous stirring. As soon as the foaming commenced, the material was poured into a mold and cured at room temperature followed by exposure to 105°C. for about one hour. The finished urethane foam showed good cell structure and resiliency, very little shrink and good flame retardancy.

EXAMPLE IX

Another urethane foam was prepared by the procedure of Example VIII except that only 35 grams of a polyalkylene polyether, MW. 3000 (LG-56) was used along with 15 grams of the phosphonated homopolymer of Example III. In addition, the silicone surfactant L-520 (Union Carbide) was increased to 1.2 gram and the amount of tin catalyst (stannous octoate) was increased to 0.2 gram. With these modifications a flexible foam was made that exhibited good cell structure and resiliency with little shrink and excellent flame retardancy.

Obviously, many modifications and variations of the invention as hereinbefore set forth may be made without departing from the spirit and scope thereof and, therefore, only those limitations should be imposed as are indicated in the appendant claims.

I claim:

1. A novel compound represented by the formula

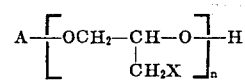

wherein A is hydrogen or an alkyl group of less than about six carbons, $n$ is an integer of 2 to about 100, B is H or $-CH_2X$ with the condition that not all B's are H; X can be halogen, H and $-PO(OR)_2$ however some X's must be halogen and some X's must be $-PO(OR)_2$ so that the molecule contains about 20 to about 69 percent by weight of halogen and R is an alkyl radical of one to four carbon atoms.

2. The compound of claim 1 wherein B is $CH_2X$ and wherein X is halogen and $-PO(OR)_2$.

3. The compound of claim 2 wherein the halogen is bromine, chlorine or mixtures thereof and R is either methyl or ethyl.

4. A novel compound represented by the formula

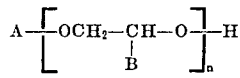

wherein A is hydrogen or an alkyl group of less than about six carbons, $n$ is an integer of 2 to about 100 and some X's are halogen and some are $-PO(OR)_2$ such that the compound contains about 1 to about 5 percent phosphorus and R is an alkyl radical of one to four carbon atoms.

5. The compound of claim 4 wherein the halogen is bromine and R is either methyl or ethyl.

* * * * *